(12) United States Patent
Spruit et al.

(10) Patent No.: US 8,154,965 B2
(45) Date of Patent: Apr. 10, 2012

(54) METHOD AND DEVICE FOR RETRIEVING INFORMATION FROM AN OPTICAL RECORD CARRIER AT VARIOUS READING SPEEDS

(75) Inventors: Johannes H. M. Spruit, Eindhoven (NL); Bas Feddes, Eindhoven (NL); Jacob G. Nijboer, Eindhoven (NL); Paul Weijenbergh, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 356 days.

(21) Appl. No.: 12/306,355

(22) PCT Filed: Jul. 4, 2006

(86) PCT No.: PCT/IB2006/052246
§ 371 (c)(1),
(2), (4) Date: Dec. 23, 2008

(87) PCT Pub. No.: WO2008/004032
PCT Pub. Date: Jan. 10, 2008

(65) Prior Publication Data
US 2010/0165804 A1    Jul. 1, 2010

(51) Int. Cl.
*G11B 7/00*  (2006.01)
(52) U.S. Cl. ............ 369/47.5; 369/53.26; 369/94

(58) Field of Classification Search ........... 369/47.5, 369/53.26, 116, 94, 189, 47.53
See application file for complete search history.

(56) References Cited

U.S. PATENT DOCUMENTS

| | | | | |
|---|---|---|---|---|
| 5,390,162 A | * | 2/1995 | Fukumoto et al. | 369/116 |
| 5,974,025 A | * | 10/1999 | Yamada et al. | 369/288 |
| 6,111,841 A | * | 8/2000 | Iida et al. | 369/47.53 |
| 6,456,584 B1 | * | 9/2002 | Nagata et al. | 369/275.2 |
| 6,545,964 B1 | * | 4/2003 | Takase et al. | 369/47.51 |
| 7,768,885 B2 | * | 8/2010 | Kitagaki et al. | 369/47.5 |
| 2002/0181365 A1 | * | 12/2002 | Nakajo | 369/47.53 |
| 2003/0214893 A1 | * | 11/2003 | Yang | 369/53.26 |
| 2004/0052176 A1 | * | 3/2004 | Narumi et al. | 369/47.39 |
| 2005/0286390 A1 | * | 12/2005 | Minemura et al. | 369/116 |
| 2006/0221787 A1 | * | 10/2006 | Kitagaki et al. | 369/47.5 |

FOREIGN PATENT DOCUMENTS
| | | |
|---|---|---|
| EP | 0898272 A2 | 2/1999 |
| EP | 1477970 A1 | 11/2004 |
| JP | 2003099948 A | 4/2003 |

* cited by examiner

*Primary Examiner* — Mohammad Ghayour
*Assistant Examiner* — Thomas Alunkal

(57) ABSTRACT

The present invention is related to a method and a reading device (1) for retrieving information from an optical record carrier (10) in which the read power level of a radiation beam (3) for scanning the optical record carrier is set in dependence on the read-out speed. The invention is also related to a record carrier for use with such a method and a reading device.

9 Claims, 3 Drawing Sheets

METHOD AND DEVICE FOR RETRIEVING INFORMATION FROM AN OPTICAL RECORD CARRIER AT VARIOUS READING SPEEDS

FIELD OF THE INVENTION

This invention relates to a method of retrieving information from an optical record carrier comprising the steps of setting a power level of a radiation beam to a predetermined read power level, scanning the record carrier by the radiation beam, detecting a reflected radiation beam reflected from the record carrier, and retrieving the information from the reflected radiation beam.

This invention further relates to a reading device for carrying out such a method comprising a radiation source for generating a radiation beam, a setting means for setting a power level of the radiation beam to a predetermined read power level, a scanning means for scanning the record carrier by the radiation beam, a detector for transferring a reflected radiation beam, said reflected radiation beam reflected from the record carrier, into an electrical signal, and a decoding means for retrieving the information from said electrical signal.

BACKGROUND OF THE INVENTION

In optical record carriers information is encoded in a pattern of optically detectable marks and of spaces between the marks in an information layer of the optical record carrier. These marks may be in the form of embossed pits, such as for example in Read Only type record carriers, in the form of changed optical properties of a dye layer, such as for example in Recordable type record carriers, or in the form of amorphous areas in a crystalline layer, such as for example in Rewritable type media. In general these marks are stored along a spiral shaped or concentric shaped track on the information layer of a disc like optical record carrier. An optical record carrier may comprise a single information layer or multiple information layers separated by spacer layers, such as for example a Dual Layer disc consisting of two information layers.

In a reading device information is retrieved from such an optical record carrier by irradiating the information layer of the optical record carrier by a radiation beam, such as for example a laser light beam, and detecting the radiation beam reflected from the optical record carrier. When the radiation beam scans the information layer along the track, the reflected radiation beam is modulated according to the pattern of marks and spaces stored on the information layer. This modulated reflected radiation beam is transferred into a modulated electrical signal by a detector. By decoding this modulated electrical signal the information stored on the optical record carrier is retrieved.

The Signal-to-Noise Ratio (SNR) of the modulated electrical signal representing the information read from the optical record carrier depends on the optics and electronics of the reading device. In general the SNR of the modulated electrical signal decreases with increasing reading speed. This because at increasing reading speeds the bandwidth of the detection electronics in the reading device needs to increase, thereby increasing all kinds of noise contributions, such as noise of the radiation source, electronic noise, shot noise, etcetera.

When reading optical record carriers, a more optimum SNR is obtained in case of high radiation levels. The signal level of the modulated reflected radiation beam, and thereby the signal level of the modulated electrical signal, is proportional to $$P_r \cdot M \cdot R,$$

where $P_r$ is the power of the radiation beam (often referred to as the read power), M is the modulation of the marks and spaces, and R is the reflectivity of the information layer.

It is a problem of current optical systems, especially when using optical record carriers having a low reflectivity, such as for example Dual Layer DVD Rewritable systems and Recordable and Rewritable BluRay Disc systems, that the Signal-to-Noise Ratio of the modulated electrical signal representing the information read from the optical record carrier, often referred to as the read-out signal, becomes too low at higher read-out speeds when using conventional read powers, thus causing errors in the retrieved information. This is especially the case in low cost systems, where, in general, the efficiency of the optical path from the record carrier to the detector is low.

In future optical systems where the number of information layers in the optical record carrier is increased to three or more, the Signal-to-Noise Ratio of the read-out signal may even further decrease due to the decreasing reflectivity of the individual information layers with increasing number of stacked information layers in a record carrier.

OBJECT OF THE INVENTION

It is an object of the present invention to provide a method and a reading device that provide a modulated electrical signal having a sufficiently high Signal-to-Noise Ratio at higher read-out speeds, thereby allowing the information to be reliably retrieved even at these high read-out speeds.

SUMMARY OF THE INVENTION

This object is achieved by providing a method according to the opening paragraph which is characterized in that the power level of the radiation beam is set in dependence on a read-out speed to a read power level of $$((1-\alpha)+\alpha\sqrt{n}) \cdot P_N$$

where $\alpha$ is a predetermined parameter with $0.2 < \alpha < 0.8$, $P_N$ is a read power level at a nominal read-out speed, often referred to as reference read-out speed, and n is the actual read-out speed divided by the nominal read-out speed. $P_N$ is usually expressed in mW. This object is further achieved by providing a reading device according to the opening paragraph which is characterized in that the setting means is arranged for setting the power level of the radiation beam in dependence on a read-out speed to a read power level of $$((1-\alpha)+\alpha\sqrt{n}) \cdot P_N$$

where $\alpha$ is a predetermined parameter with $0.2 < \alpha < 0.8$, $P_N$ is a read power level at a nominal read-out speed, and n is the actual read-out speed divided by the nominal read-out speed.

According to the present invention it is proposed to increase the read power level of the radiation beam as a function of the read-out speed, thereby compensating for the negative influence of the bandwidth of the electronics and/or the reduced reflectivity of the information layer on the Signal-to-Noise Ratio. Normally increasing the read power level of the radiation beam would at a certain power level result in the degradation of the read stability, i.e. the number of times a record carrier can be read repeatedly without a signification deterioration of the record carrier. Therefore a maximum read power level is specified for the various optical systems. However, the inventors had the insight that this maximum read power level increases with an increasing read-out speed, thereby allowing higher read power levels to be used at higher read-out speeds without degrading the read stability.

It is noted that from a theoretical point of view a read power level which increases proportional to $\sqrt{n}$ would be indicated. However the inventors had the further insight that such a dependency between read power level and read-out speed could result in destructive read power levels at high read-out speeds, resulting in a permanent loss of information on the record carrier being read. According to the present invention the read power level increases less than proportional to $\sqrt{n}$, i.e. $\alpha$ has a value less than one. This allows for sufficiently high read power levels at all read-out speeds, without destroying information on the record carrier.

It is noted that the object of the present invention is achieved without the need for expensive and/or complex electronic or optical components.

The values of the parameters $\alpha$ and $P_N$ generally depend on properties of the record carrier. It is noted that when reading the different information layers of a multi-layer record carrier, each individual information layer may have its own parameters values associated to it. It is further noted that the nominal read-out speed, at which the read power level $P_N$ is specified, is generally chosen to be the, so-called, 1× read-out speed corresponding to n=1. This 1× speed is the lowest read-out speed specified in the optical system.

The manufacturer of the optical disc may determine these parameter values during the manufacturing process. Subsequently these values have to be communicated to a reading device. This may be achieved by providing these values in an area for holding record carrier related information on the record carrier itself, e.g. in the so-called ADIP, which area can be read out by the reading device. Alternatively, the values of the parameters $\alpha$ and $P_N$ are specified in a specification of the optical system. Now, the manufacturer of the optical disc should adhere to these specifications during the manufacturing process of the record carrier.

In preferred embodiments of the invention the value of $\alpha$ is in the range between 0.33 and 0.5.

In embodiments of the invention for use with Dual Layer DVD Rewritable optical record carriers (DVD+RW DL) especially good values for the parameters $\alpha$ and $P_N$ are $\alpha$=0.462 and $P_N$=1.3 mW, resulting in a read power level of $0.7+0.6\sqrt{n}$ mW, or, alternatively, $\alpha$=0.385, resulting in a read power level of $0.8+0.5\sqrt{n}$ mW.

It should be noted that a read power level of $$((1-\alpha)+\alpha\sqrt{n})\cdot P_N$$

in fact is an optimum value of the read power level, being an optimum trade off between increasing the Signal-to-Noise Ratio by increasing the read power level and maintaining read stability by preventing destructively high read power levels. Therefore, the read power level of $$((1-\alpha)+\alpha\sqrt{n})\cdot P_N$$

could also be considered the read-out speed dependent upper boundary of a save operating area of read power levels; the fixed valued lower boundary being at the read power level for the lowest read-out speed. Now any read power level below the upper boundary and above the lower boundary can be selected from this save operating area, resulting in an improved, but not necessary optimum, read performance.

BRIEF DESCRIPTION OF THE DRAWINGS

These and other objects of the invention will be apparent from and elucidated further with reference to the embodiments described by way of example in the following description and with reference to the accompanying drawings, in which.

DETAILED DESCRIPTION OF THE DRAWINGS

Figure 1:
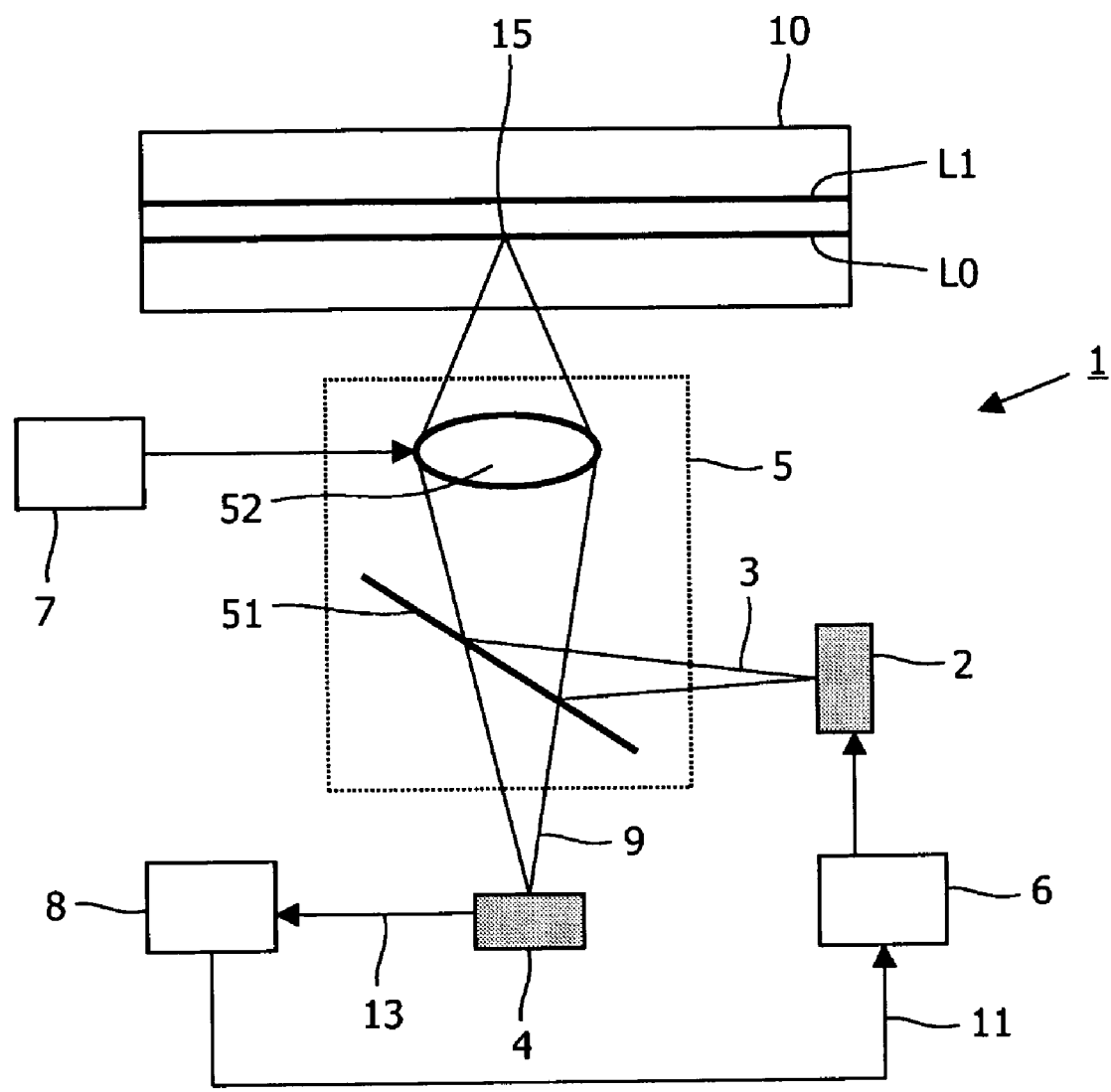
FIG. 1 shows an embodiment of a reading device according to the invention, FIG. 2 are graphs showing the dependency of the read power level of the radiation beam on the read-out speed, and FIG. 3 are graphs of experimental data, with fitted curves according to the formula of the invention.

FIG. 1 shows a reading device 1 according to an embodiment of the invention for retrieving information from an optical record carrier 10. In this example the optical record carrier 10 is shown to be a Dual-Layer record carrier comprising two information layers (L0, L1). It is however noted that the invention works equally well with single-layer information carriers and with multi-layer information carriers comprising more than two information layers.

The reading device 1 comprises a radiation source 2, such as for example a diode laser, for generating a radiation beam 3, such as for example a laser light beam. This radiation beam 3 scans the optical record carrier 10 by way of well know scanning means. These scanning means include, for example, a motor (not shown) for rotating the record carrier about its center and a lens system 5, comprising a beam splitter 51 and an objective lens 52, for forming the radiation beam into a focusing spot 15 on an information layer of the record carrier. In FIG. 1 the radiation beam 3 is shown focused on a first information layer of the record carrier located closest to the entrance surface of the radiation beam, often referred to as the L0 layer. However, under control of focusing and tracking means 7, which are also considered to be part of the scanning means, the radiation beam may also be focused on the other information layer, often referred to as the L1 layer.

When the record carrier is rotated, the focusing and tracking means 7 ensure that the focal spot 15 scans a track on the information layer along which the information to be retrieved is stored. A reflected radiation beam 9 reflected by the information layer L0 is guided by the lens system 5 towards a detector 4. This reflected radiation beam 9 is modulated according to the pattern of marks and spaces between the marks along the track being scanned. The detector 4 converts the incident reflected radiation beam 9 into one or more electrical signals. At least one of these electrical signals, i.e. the modulated electrical signal 13, has a modulation that is related to the information being read. This modulated electrical signal 13 is applied to decoding means 8 for retrieving the actual information itself.

The reading device 1 further comprises setting means 6 connected to the radiation source 2 for controlling the power level of the radiation beam 3 generated by the radiation source. In prior art reading devices these setting means 6 set the power level of the radiation beam to a predetermined read power level when retrieving information from an optical record carrier 10.

It is to be noted that when the reading device is combined with a recording device for writing information into a recordable optical record carrier, the radiation source 2 may also be used for generating a radiation beam for writing the information into the recordable record carrier. In such a combined device the setting means 6 are generally also used for setting the power level of the radiation beam to a, generally higher, write power level or to a pattern of write power levels.

In a reading device according to the present invention the setting means 6 are arranged to set the read power level of the radiation beam in dependence on the read-out speed, also referred to as the linear velocity. It is to be noted that the setting means 6 may be implemented by several distinct hardware elements, and/or by means of a suitably programmed controller.

In general, a faster read-out speed allows for a faster retrieval of the information from the optical record carrier. In Constant Angular Velocity (CAV) devices the angular velocity of disc-shaped record carriers remains constant while the read-out speed (that is, the linear velocity) varies from the inner diameter of the disc to the outer diameter of the disc.

According to the present invention the setting means 6 set the power level of the radiation beam 3 to a read power level of $$((1-\alpha)+\alpha\sqrt{n}) \cdot P_N$$

where $\alpha$ is a predetermined parameter with $0.2 \leq \alpha \leq 0.8$, $P_N$ is a read power level at a nominal read-out speed, and n is the actual read-out speed divided by the nominal read-out speed. The nominal read-out speed is generally chosen to be the so-called 1×, or reference, speed, corresponding to n=1.

Figure 2:
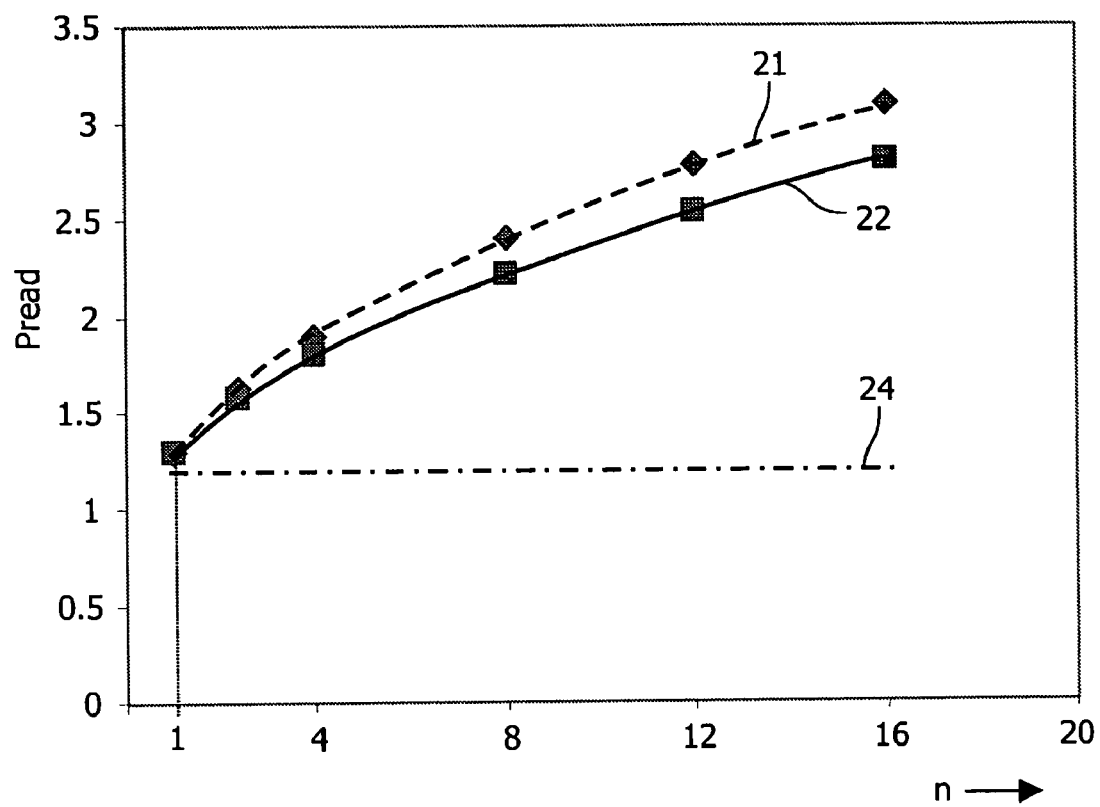

In embodiments of the invention for use with Dual Layer DVD Rewritable optical record carriers (DVD+RW DL) especially good values for the parameters $\alpha$ and $P_N$, are $\alpha=0.462$ and $P_N=1.3$ mW, or, alternatively, $\alpha=0.385$ and $P_N=1.3$ mW. This is shown in the graphs of FIG. 2 where the vertical axis represents the read power level (in mW) and the horizontal axis represents n, being the actual read-out speed divided by the nominal read-out speed. The dashed curve 21 represents $\alpha=0.462$ resulting in a read power level curve of $0.7+0.6\sqrt{n}$ mW, while the drawn curve 22 represents $\alpha=0.385$ resulting in a read power level curve of $0.8+0.5\sqrt{n}$ mW.

The dashed line 24 represents a fixed read power level of 1.2 mW, which is defined in the prior art as a nominal read power level for testing purposes. This dashed line 24 can be considered the lower boundary of a save operating area of read power levels. The upper boundary of this save operating area of read power levels being the drawn curve 22, or, alternatively, the dashed curve 21. Any read power level may now be selected from this save operating area, resulting, on the on hand, in an improved read performance and, on the other hand, in a maintained read stability.

In an alternative embodiment of the invention the manufacturer of the optical disc 10 determines the parameter values during the manufacturing process and provides these values in an area for holding record carrier related information on the record carrier 10 itself. Such an area for holding record carrier related information is, for example, the known ADIP and ATIP. The reading device 1 shown in FIG. 1 now reads, for example at a read-out speed of 1×, i.e. at the reference speed, and/or using the defined nominal read power for testing purposes, the parameter values from the record carrier itself communicates them, through signal 11, to the setting means 6. The setting means 6 subsequently uses these read parameter values for setting the read power level at the higher read-out speeds.

Figure 3:
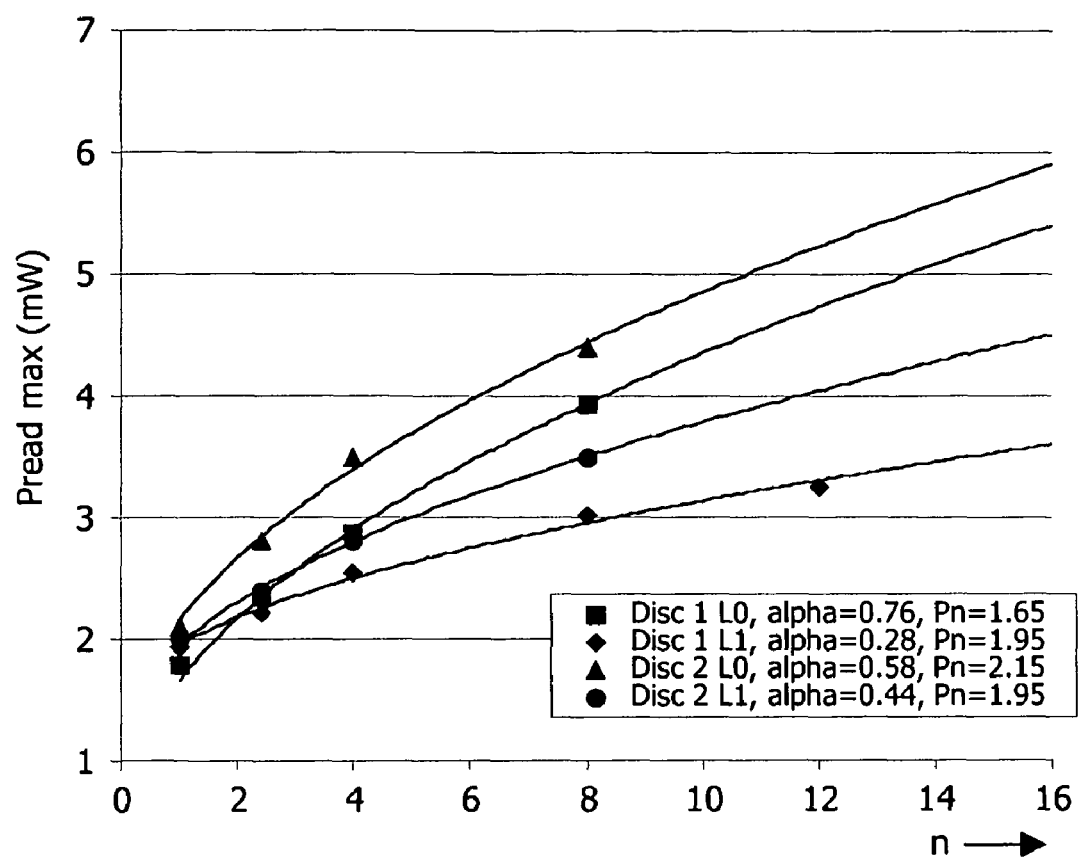

FIG. 3 shows graphs of experimental data, with fitted curves according to the formula of the invention. All measurement data can well be fitted using this formula, showing that this a good expression to describe the maximum read powers.

A general requirement for repeated read is that a disc can be read out a million times, while remaining within specification, e.g. of mark jitter level. In experiments on a DVD rewritable disc the number of read cycles is determined for different read powers and read speeds. Usually read power at which the disc can be read out a million times is determined by extrapolation of experimental data points obtained at higher read powers corresponding to lower number of read cycles. The measurements in FIG. 3 give the read power at which precisely 1 million read cycles can be achieved. In practical applications a lower maximum read power is chosen to obtain margins for:

Accuracy for setting the read power

Higher disc temperatures

Lower modulation frequency of the laser (the lower the modulation frequency, the higher the peak powers are)

Drive to drive differences (spot size, wavelength, etc.)

The two extreme situations in practice to obtain a margin are: using a multiplication factor or obtaining the margin by using an offset. Situations in between can occur as well. When the additional margin as a function of speed n is given by a factor, in practice the value of Pn will be chosen lower. When the additional margin as a function of speed is given by an offset in mW, in practice Pn will be chosen lower and $\alpha$ will be chosen higher.

The invention claimed is:

1. A method of retrieving information from an optical record carrier comprising the steps of:

setting a power level of a radiation beam to a predetermined read power level, scanning the record carrier by the radiation beam, detecting a reflected radiation beam reflected from the record carrier, and retrieving the information from the reflected radiation beam, wherein the power level of the radiation beam is set, in dependence on a ratio of actual read-out speed divided by a nominal read-out speed, to a read power level of $$((1-\alpha)+\alpha\sqrt{n}) \cdot P_N$$

where $\alpha$ is a predetermined parameter with $0.2 < \alpha < 0.8$, and $P_N$ is a read power level at a nominal read-out speed, and n is the actual read-out speed divided by the nominal read-out speed.

2. A method as claimed in claim 1, wherein the value of $\alpha$ is in a range between 0.33 and 0.50.

3. A method as claimed in claim 1, wherein said method further comprises a step of retrieving a value of the parameter $\alpha$ from the optical record carrier, and wherein the power level of the radiation beam is set in dependence on the retrieved value of the parameter $\alpha$.

4. A method as claimed in claim 1 for retrieving information from a multi-layer optical record carrier, wherein the power level of the radiation beam is set for each information layer individually, each information layer having a predetermined parameter $\alpha$ to it.

5. A reading device for retrieving information from an optical record carrier comprising a radiation source for generating a radiation beam, a setting means for setting a power level of the radiation beam to a predetermined read power level, a scanning means for scanning the record carrier by the radiation beam, a detector for transferring a reflected radiation beam, said reflected radiation beam reflected from the record carrier, into an electrical signal, and a decoding means for retrieving the information from said electrical signal, the setting means is arranged for setting the power level of the radiation beam in dependence on a ratio of actual read-out speed divided by a nominal read-out speed to a read power level of $$((1-\alpha)+\alpha\sqrt{n}) \cdot P_N$$

where α is a predetermined parameter with 0.2<α<0.8, and $P_N$ is a read power level at a nominal read-out speed, and n is the actual read-out speed divided by the nominal read-out speed.

6. A reading device as claimed in claim 5, wherein the value of α is in a range between 0.33 and 0.50.

7. A reading device as claimed in claim 5, wherein said reading device further comprises retrieving means for retrieving a value of α from the optical record carrier, and wherein the setting means are arranged for setting the read power level in dependence on the retrieved value of the parameter α.

8. Optical record carrier -comprising an area consisting of patterns of optically detectable marks and of spaces between the marks representing parameter values indicative of properties of the record carrier, wherein said area comprises patterns of optically detectable marks and of spaces between the marks representing a value of α for use in a method as claimed in claim 3.

9. Optical record carrier as claimed in 8 comprising multiple information layers, wherein said area comprises patterns of optically detectable marks and of spaces between the marks representing values of the parameter α for each of the information layers.

* * * * *